United States Patent [19]
Pikus et al.

[11] Patent Number: 5,410,984
[45] Date of Patent: May 2, 1995

[54] SYSTEM FOR POLYMER CRYSTALLIZATION

[75] Inventors: Ilya Pikus, Plymouth; Greg J. Kimball, Blaine; Masayuki Inoue, Henn, all of Minn.

[73] Assignee: Bepex Corporation, Minneapolis, Minn.

[21] Appl. No.: 24,404

[22] Filed: Mar. 1, 1993

[51] Int. Cl.$^6$ .............................................. C30B 35/00
[52] U.S. Cl. ................................ 117/206; 23/295 R; 117/4; 117/204
[58] Field of Search ............. 23/295 R, 300; 156/601, 156/DIG. 113; 422/250, 251, 254; 117/3, 4, 11, 204, 206

[56] References Cited

U.S. PATENT DOCUMENTS

| | | | |
|---|---|---|---|
| 2,642,342 | 6/1953 | Vahl | 23/300 |
| 3,393,055 | 7/1968 | Stevenson | 23/295 R |
| 3,844,725 | 10/1974 | Nenicka | 23/300 |
| 4,161,578 | 7/1979 | Herron | 528/272 |
| 4,223,128 | 9/1980 | Halek et al. | 528/481 |
| 4,486,395 | 12/1984 | Witte et al. | 422/254 |
| 5,230,769 | 7/1993 | Jancic et al. | 23/295 R |

OTHER PUBLICATIONS

TorusDisc Dryer Article; Bepex Corporation; pp. 1–7.
Crystal Growth; 2nd ed.; Pamplin; pp. 56–57; (1980), Section 2.8(2.8.1).

*Primary Examiner*—R. Bruce Breneman
*Assistant Examiner*—Felisa Garrett
*Attorney, Agent, or Firm*—Rockey, Rifkin & Ryther

[57] ABSTRACT

A system for crystallization of polymers involving the use of a stationary housing with a rotor mounted for rotation within the housing. The rotor supports a plurality of spaced apart hollow discs and heated fluid is delivered to the interior of the discs. The polymer material to be treated is fed into the housing for heat exchange contact with the exterior surfaces of the discs. The rotation of the discs in addition serves as the propelling force for the material along the length of the housing at which point the material is discharged. The speed of rotation of the rotor is controlled to influence agitation and conveying of material in the housing to thereby control the crystallization reaction. A holdup mechanism which operates independently of the speed control is located adjacent the discharge location to contribute to the fixing of the residence time. The material inlet operation, discharge operation and residence control are such that the ratio of crystallized to uncrystallized material is maintained within desired limits, typically at about 4 to 1. The method and apparatus provides various other operating parameters and structural features which maximize the efficiency of the crystallization reaction.

25 Claims, 11 Drawing Sheets

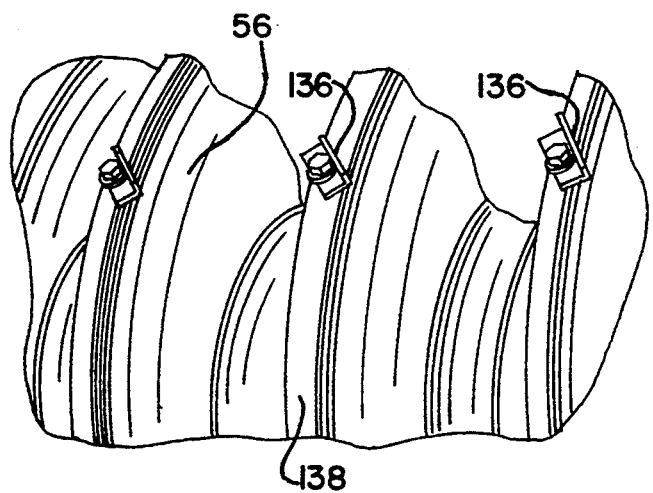
FIG. 3A
FIG. 3B
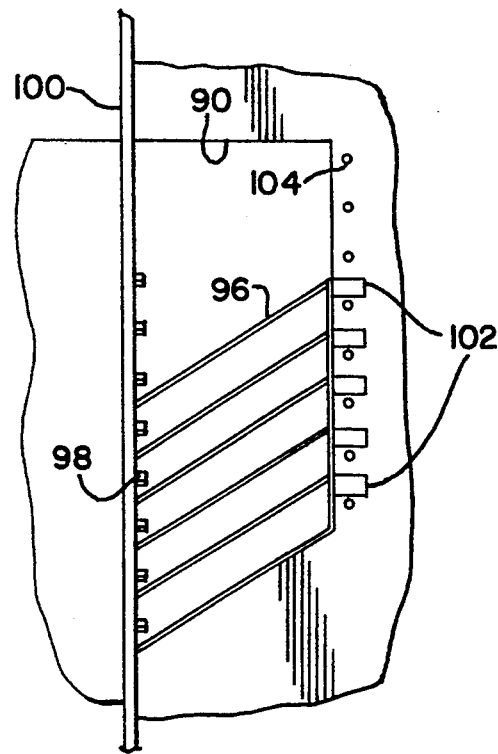
FIG. 3C
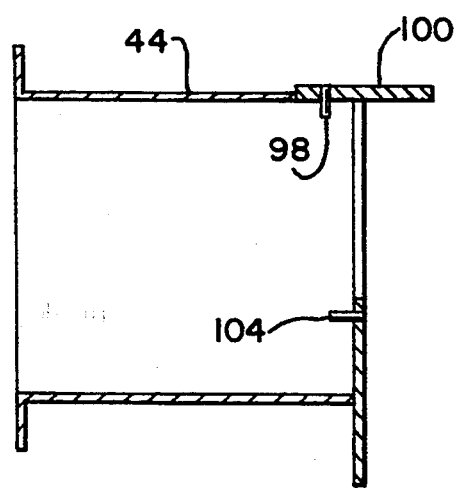

SYSTEM FOR POLYMER CRYSTALLIZATION

BACKGROUND OF THE INVENTION

This invention relates to a system comprising a method and apparatus for crystallization of polymers, particularly polyesters. Several prior art systems involving both mechanical and pneumatically agitated vessels have been traditionally used to process homopolymers; however, where copolymers are involved, traditional crystallizers do not provide desired efficiencies from the standpoint of cost and ease of operations.

Pneumatically agitated systems, that is systems employing a fluidized bed, have capacities in excess of three tons per hour; however, there is a high tendency in such systems for material chips to stick together. Furthermore, such systems involve high energy consumption which increases the difficulty in operating the system.

Mechanically agitated systems, that is systems using mixers with heat exchange capacities, have involved excess generation of fines. In addition, it is difficult to achieve high production rates since long residence times for crystallization are required in such mechanical systems. Prior art systems of the mechanical type which have been developed for polymer crystallization are disclosed in Halek, et al. U.S. Pat. No. 4,223,128 and Herron U.S. Pat. No. 4,161,578.

SUMMARY OF THE INVENTION

The system of this invention involves a crystallizer of the mechanically agitated type which achieves significant operating efficiency. In particular, the invention contemplates a system for crystallization of copolymers, or combinations including copolymers and homopolymers, for example, the treatment of chips of polyethylene terephthalate for crystallization thereof in a system having a capacity between about 2 and 10 tons per hour. Relatively short residence times also characterize the system with residence times from 5 to about 60 minutes being required depending upon the particular polymer involved. The system provides sufficient agitation for achieving suitable reactions while minimizing the formation of fines and avoiding any tendency toward sticking or sintering. All of these results are achieved with relatively low energy consumption.

The apparatus of the invention more specifically involves a stationary housing having a rotor supporting a plurality of spaced-apart hollow discs mounted along the length of the rotor. The apparatus thus involves the use of a structure such as a TORUSDISC® manufactured by Bepex Corporation, the assignee of this application, with certain modifications characteristic of this invention.

The housing includes input means for delivering heated fluid to the interior of the discs for thereby controlling the exterior surface temperature of the discs. Material feed inlet means are associated with the housing whereby the polymer material introduced will engage the exterior surfaces of the discs to provide the heat exchange necessary for achieving the crystallization reaction.

The discs are rotated by the supporting rotor which operates to propel material along the length of the housing toward material outlet means. Control means are associated with the rotor driving means to achieve a speed of rotation of the rotor consistent with the desired intensity of material agitation as well as required conveyance of material in the housing. Holdup control means are located adjacent the outlet means defined by the housing for independently influencing the discharge of material and for thereby fixing the residence time of the material in the housing.

In the method of operating the apparatus described, various steps are taken to achieve maximum efficiency in the crystallization reaction while minimizing stickiness and sintering of chips. Thus, means are provided for controlling the ratio of crystallized to uncrystallized or amorphous material in the inlet end section of the housing at levels between 2 to 1 and 20 to 1, preferably in the order of 4 to 1. In one form of the invention, material is introduced through separate spaced-apart inlet means for adding an element of control for the reactions taking place. Independent heating fluid inlet means may be provided for the sections of the rotor so that adjacent sections will be maintained at different temperature to achieve optimal temperature kinetics and accordingly optimal reaction rates for the polymer material. Another feature of the invention involves the use of rotor sections having varying diameters whereby the heat exchange surface area encountered by the material being introduced will vary in different sections of the apparatus.

A method and means is also provided for minimizing any tendency of portions of the material to have a longer residence time in the housing relative to other portions of material. Thus, the system design avoids any tendency of material to occupy "stagnant zones" or "dead spaces" as the material progresses through the housing. Breaker bar means are also preferably employed to increase the relative velocity between discs and moving bed and minimize any tendency of material to stick to surfaces within the housing.

BRIEF DESCRIPTION OF THE DRAWINGS

FIG. 3A is a detailed view of discs utilized in the system including adjustable plows or vanes for propelling material;

FIG. 3B is a detail view of a weir support means;

FIG. 3C is a horizontal view of the two support means taken about the line 3C—3C of FIG. 3B;

DETAILED DESCRIPTION OF THE DRAWINGS

Figure 2:
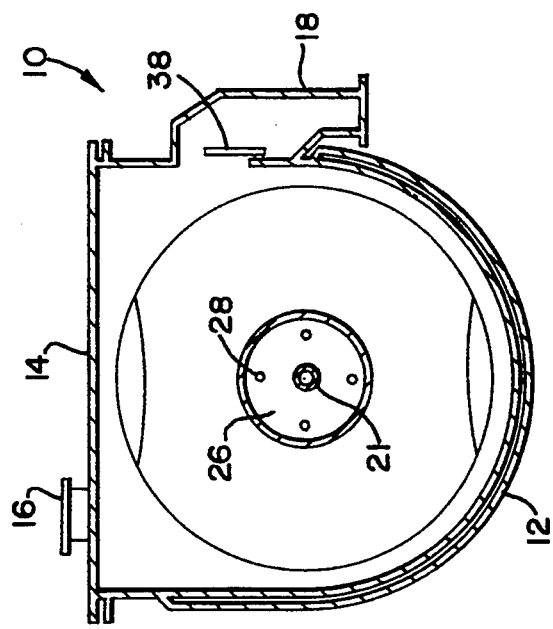
FIG. 2 is a vertical sectional view of the housing of FIG. 1.
Figure 1:
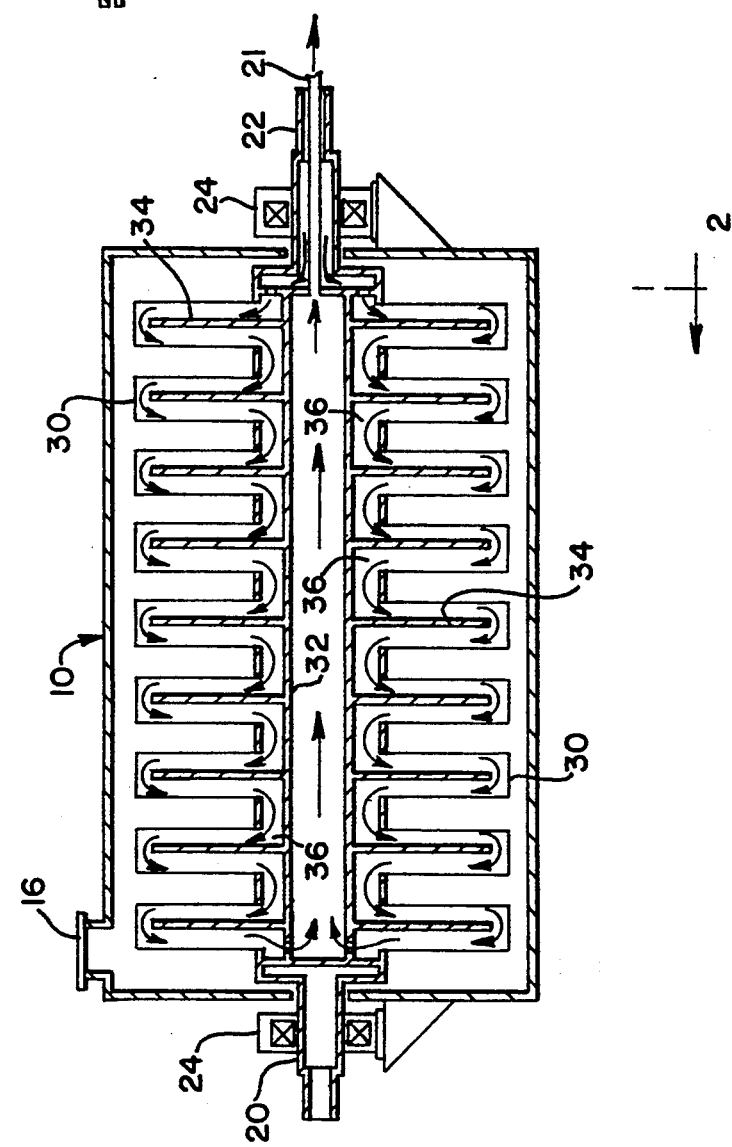
FIG. 1 is a schematic sectional view of a housing with a rotor supporting heat exchange discs of the type contemplated for use in the system of this invention.

FIGS. 1 and 2 comprise schematic views generally illustrating an apparatus of the type contemplated for use in the practice of this invention. The apparatus includes a housing 10 comprising a U-shaped bottom portion 12 and a flat upper cover 14. The upper wall supports material inlet 16 and an outlet structure 18 is located on one side wall.

A rotor defining tubular end portions 20 and 22 is mounted for rotation within the housing. Bearings 24 support these tubular end portions, and drive means (not shown) are connected to one of the tubular end portions. Means are provided for introducing heated fluid into tubular end portion 22. A plate 26 defines openings 28 for passage of the heated fluid beyond the plate and through the interiors of a plurality of discs 30 mounted on the internal rotor body portion 32.

As shown, each of the discs 30 comprises an internal plate 34 which causes heated fluid to flow radially outwardly to the periphery of the discs and radially inwardly into an annular passage 36 which communicates adjacent discs. The result is that heated fluid introduced through tubular end 22 circulates through the respective discs and then eventually passes outwardly through outlet pipe 21 associated with tubular end 22. As indicated, a system of the type shown in FIGS. 1 and 2 is known in the art, and the exterior surfaces of the discs are known to provide heat transfer surfaces. Accordingly, material introduced through an inlet 16 will be heated through contact with these exterior surfaces while being propelled through the housing to the outlet 18. In the embodiment shown, the heat transfer fluid flows countercurrent with respect to material being treated; however, the system is equally suited for co-current movement of the heating fluid and material.

The outlet means shown in FIG. 2 includes a weir 38 which is employed for controlling the level of material within the housing 10. Thus, when material has been propelled to the discharge end of the apparatus, the propelling action of the discs will lift the material over the top edge of the weir for discharge downwardly beyond the weir.

In accordance with this invention, an adjustable weir serves as a means for controlling the discharge level of material from the housing and thereby the degree of holdup of material in the housing. In that connection, this invention has as a main object the achievement of a "holdup capacity" ratio which is optimal for the particular polymer being treated. Holdup capacity ratio comprises the ratio of the amount of material in the housing at a given time which is already crystallized to the amount of material in the housing at that time which is not yet crystallized. By controlling this ratio, newly fed material will be diluted in previously introduced material which minimizes sticking and other disadvantageous results which could occur where newly fed material encounters more severe conditions immediately upon entry into the housing.

As will be apparent from a consideration of the following more detailed description, maintaining of a suitable ratio of crystallized to uncrystallized chips in the inlet section minimizes problems associated with undue sticking of material and particularly assists in avoiding problems associated with especially heat sensitive polymers. Various means are described which influence holdup capacity and which deal with sticking problems.

FIGS. 3 through 6 illustrate a specific adaptation of an arrangement of the type shown in FIGS. 1 and 2 for a system to be utilized for crystallization of polymers. The figures illustrate housing 40 provided with two material inlet means 42 and material outlet means 44 although additional inlets are contemplated. Motor 46 includes a drive shaft 48 and drive belt 50 which serves to rotate shaft 52 of the rotor 54. This rotor carries a plurality of hollow discs 56 which operate generally in the manner described with respect to FIGS. 1 and 2. Heated fluid, which may comprise hot oil, is introduced through pipe 58 for circulation through the discs. In this embodiment, the heated fluid is recirculated back through the hollow rotor and exits through outlet pipe 60.

Figure 6:
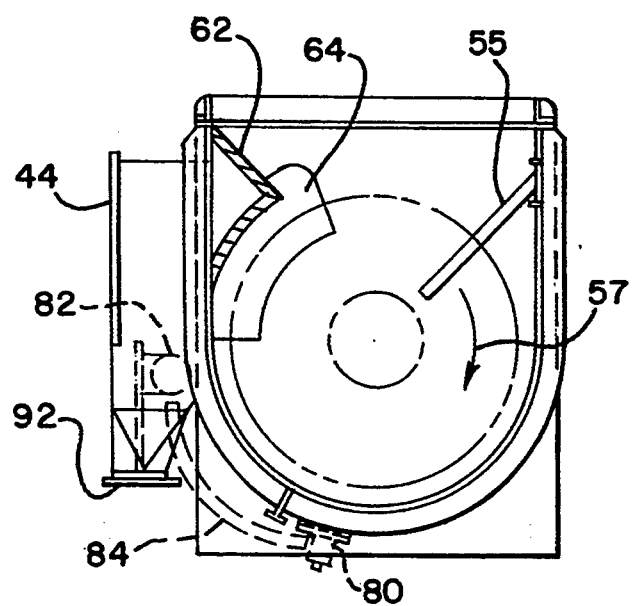
FIG. 6 is a cross-sectional view of the apparatus taken about the line 6—6 of FIG. 3.

The housing 40 supports a plurality of breaker bars 55 which extend inwardly and downwardly as shown in FIG. 6. The arrow 57 illustrates the fact that clockwise motion is imparted by the rotor when viewing the apparatus toward the discharge end. Accordingly, the material will encounter breaker bars 55 in the course of downward movement imparted by the discs.

Figure 5:
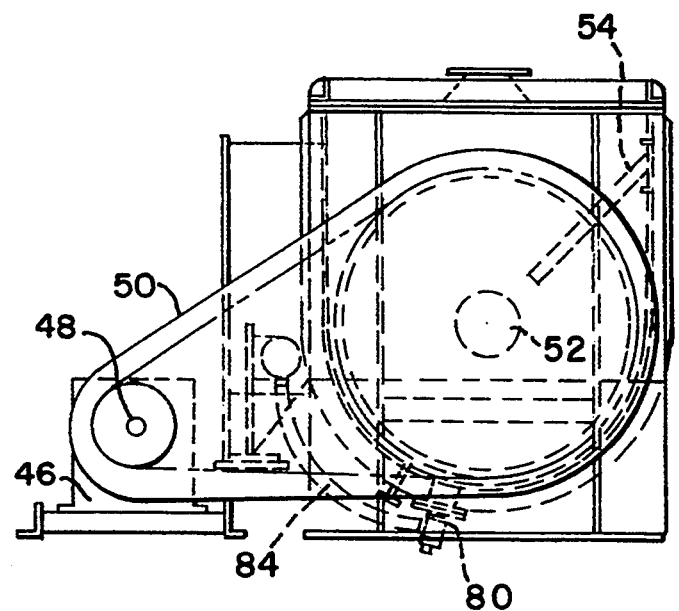
FIG. 5 is an end view of the apparatus of FIG. 3 illustrating the rotor drive and discharge means for the apparatus.

Breaker bars have previously been used in equipment of this type but primarily adjacent the inlets of the housing. Such prior bars were also located on the opposite side of the housing whereby the material encountered such bars during upward flow rather than during downward movement as shown in FIGS. 5 and 6. It has been found that in an apparatus to be used for polymer crystallization, the breaker bars are more efficiently located throughout the length of the housing or at least in the area where crystallization has commenced. Furthermore, the breaker bars are most effective for preventing sticking of material when located as illustrated to encounter material in the downward flow direction.

Figure 3:
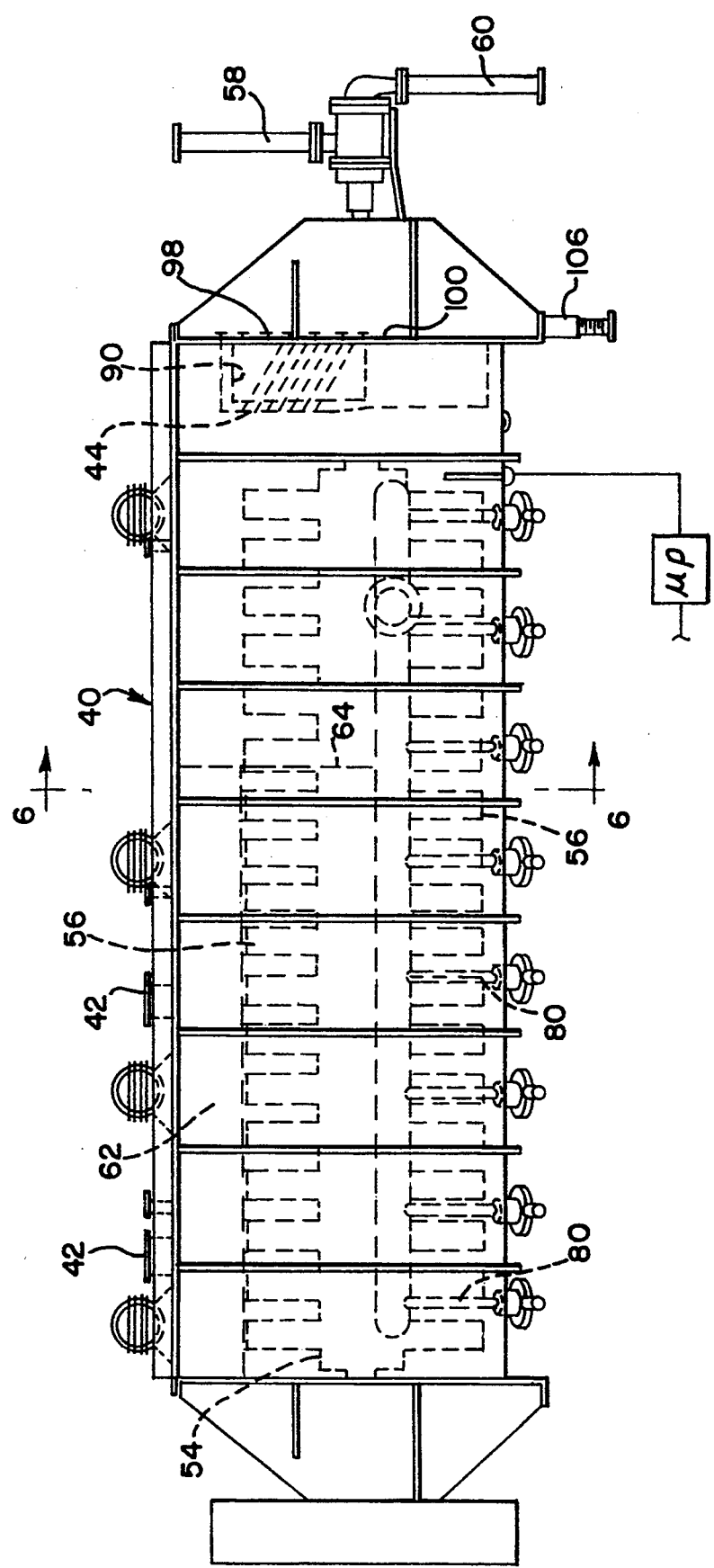
FIG. 3 is a side elevational view of a housing with associated rotor and discs modified to serve as a polymer crystallizer in accordance with the concepts of this invention.
Figure 4:
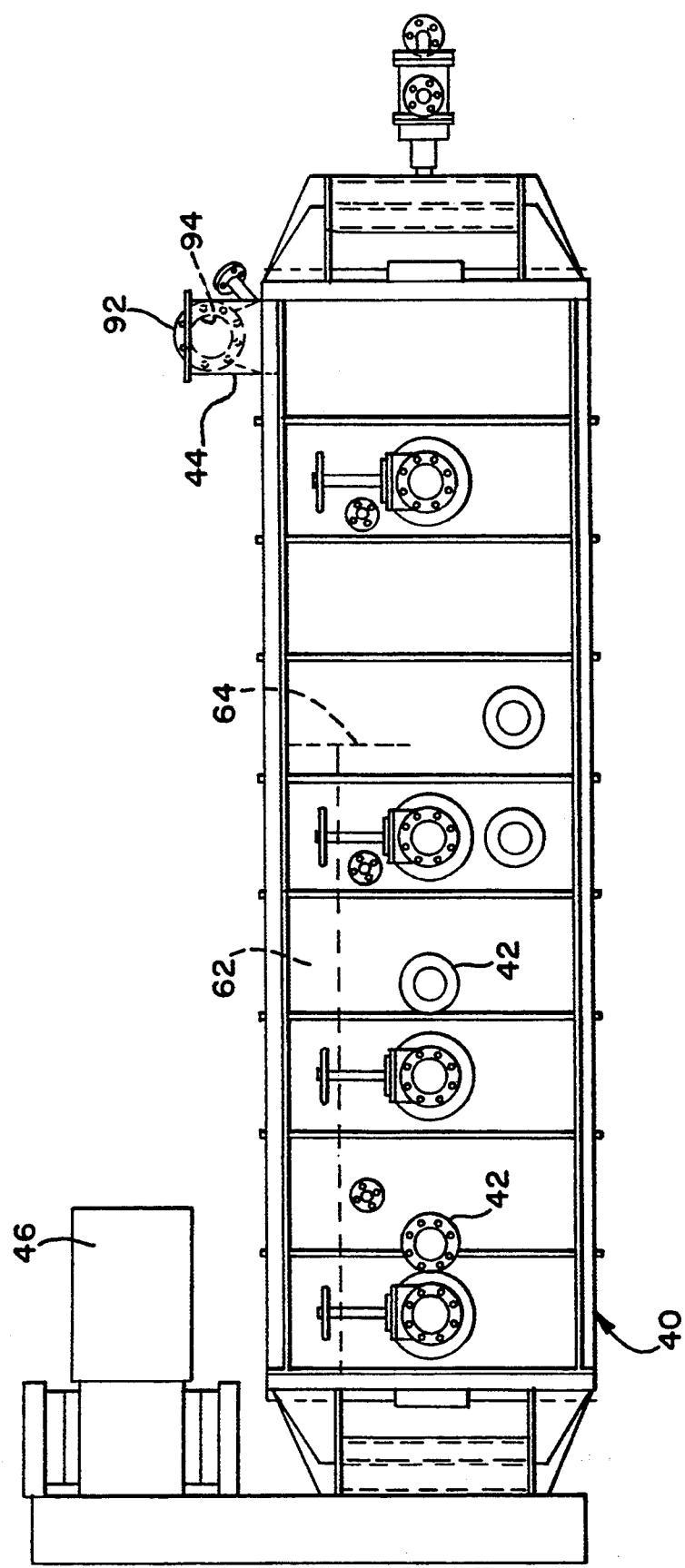
FIG. 4 is a top plan view of the apparatus shown in FIG. 3.
Figure 14:
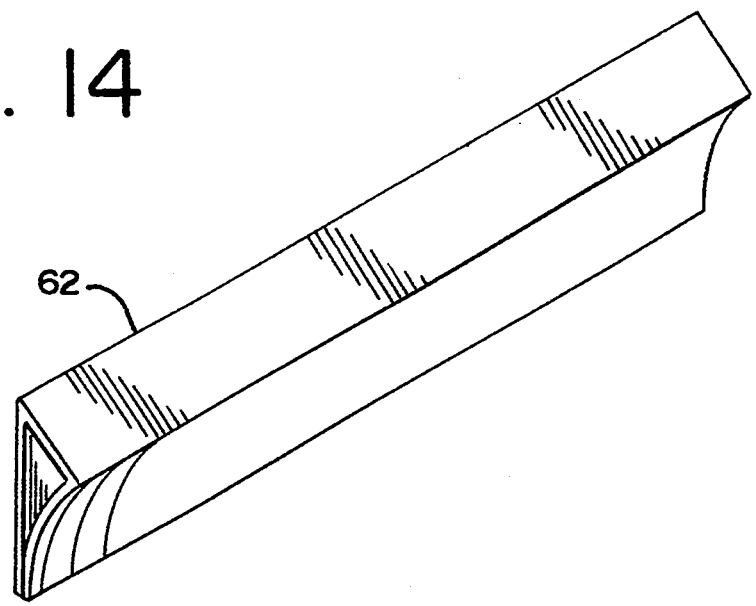
FIG. 14 is a perspective view of an insert located in the housing for minimizing the collection of material in "dead spaces" of the housing.

FIGS. 3 through 6 also illustrate the provision of an insert 62 located near the top of the housing and in an area where the discs are imparting upward movement to the material. The insert extends from the inlet end of the housing a substantial distance beyond the middle of the housing as shown in FIGS. 3 and 4. The insert also occupies a substantial amount of space in this upper corner of the housing as is particularly demonstrated by the detailed view of the insert shown in FIG. 14.

This upper corner of the housing, particularly in the area of the housing occupied by the insert, serves to eliminate a "dead space" or stagnant material zone in the housing where material would otherwise tend to collect and remain stationary or nearly stationary when compared with adjacent material being conveyed through the system. Such stagnant zones can result in substantial waste of material which has a lengthy residence in the housing and may, therefore, be subject to elevated temperature conditions to a point where the material is not usable. And, of course, the presence of such stagnant zones would result in a non-uniform ratio of crystallized to uncrystallized material followed by sticking of chips which this invention is intended to avoid.

The insert 62 is preferably combined with a baffle 64 as best illustrated in FIGS. 3, 4 and 6. This baffle is attached at the end of the insert and provides a barrier wall which tends to direct material at this location to progress around the axis of the rotor as opposed to moving toward the discharge end. This again serves to reduce the likelihood of a stagnant zone occurring in the upper corner zone of the housing.

Figure 4A:
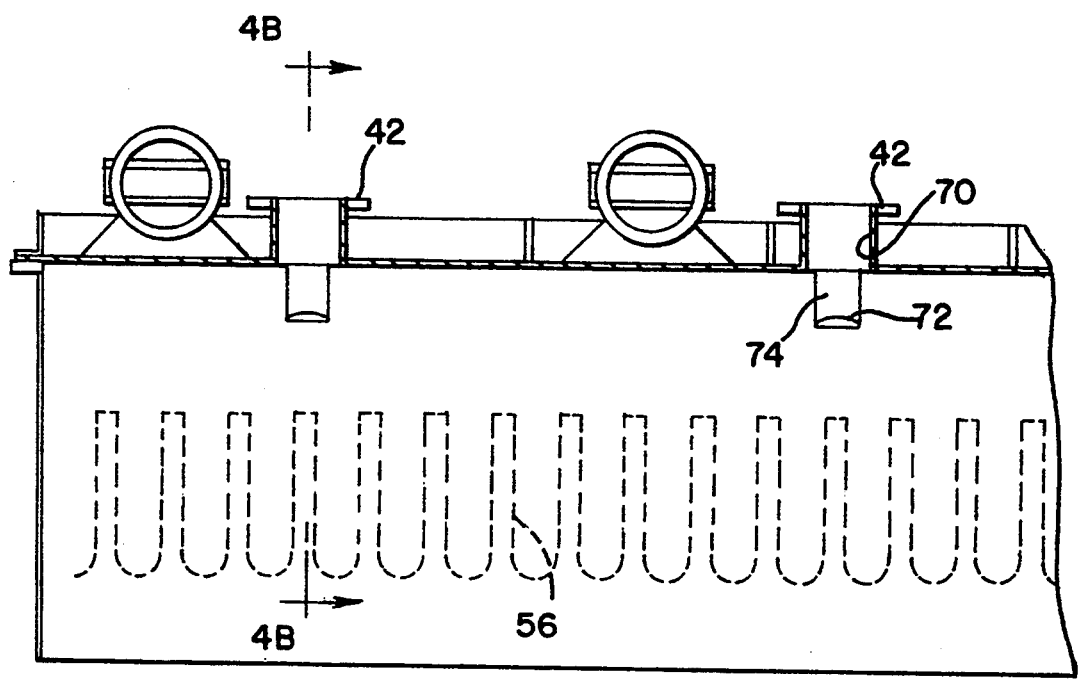
FIG. 4A is a fragmentary view illustrating the particular form of inlet means for the apparatus of FIG. 3.
Figure 4B:
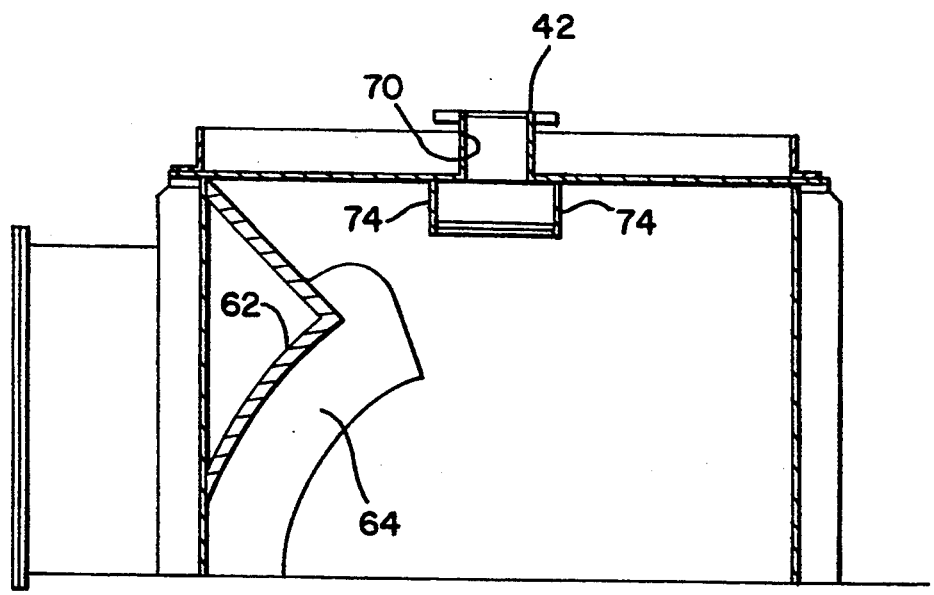
FIG. 4B is a cross-sectional view taken about the line 4B—4B of FIG. 4A.

FIGS. 4A and 4B illustrate a preferred arrangement for the inlets 42. As illustrated, each inlet defines a central passage 70 for the entry of material into the housing. Immediately below this passage, there is provided a plate 72 which is suspended from the top wall of the housing by means of end pieces 74. The plate 72 is curved, thereby providing downwardly sloping surfaces on opposite sides of the plate so that material directed through the passage 70 will tend to split into two directions and distribute more evenly over the discs. This serves to provide a more even distribution of material entering the system thereby enhancing the object of maintaining a consistent desired ratio of crystallized to uncrystallized chips at least during the early treatment stages in the inlet zone.

The provision of spaced-apart inlet openings 42 also serves to provide more even distribution of material and more efficient utilization of the heat transfer from the discs. In this connection, both of the inlet means could be used simultaneously, they can be used selectively as an operation progresses, or one or the other could be used individually depending upon the type of material being treated in the system. Additional inlet means may also be used, and it will be apparent that the provision of the spaced-apart inlet means is an especially effective means for accomplishing a desired ratio of crystallized to uncrystallized chips at least during the early treatment stages.

The apparatus of FIGS. 3 through 6 also includes a plurality of nozzles 80 adapted for the introduction of air or other gas under pressure into the interior of the housing. These nozzles are spaced along the length of the housing so that the gas can be introduced under pressure all along the length of the housing or selectively depending upon the material being treated.

The purpose of this air or other gas purge is to provide an efficient means for agitating and mixing of the material and also for regularly removing vaporized products of reaction including water, glycols, and acetylaldehydes as the crystallization reaction and drying takes place. A ratio of one pound of air to from two to 16 pounds of material being processed is contemplated with a ratio of about one pound of air to 5 pounds of material being typical. As shown in FIG. 6, a manifold 82 is provided for delivering pressurized air through conduits 84 to the nozzles 80. Any suitable means may be employed for accomplishing the introduction of the air or other gas, and the gas may be heated to provide an additional heat source where desired.

The arrangement of FIGS. 3 through 6 also includes the use of a weir arrangement adjacent the outlet for the system. Specifically, an opening 90 is provided in the side wall of the housing for communication with the outlet 44. This outlet includes a lower flange 92 which defines a central opening 94 which will typically be connected to a discharge conduit for carrying the crystallized polymer to the next operating stage.

As specifically shown in FIGS. 3B and 3C, the weir may consist of a plurality of rectangular bars 96 which are removably supported by means of studs 98 mounted on the end wall 100 of the housing. The bars include L-shaped ends 102 which engage pins 104 extending outwardly from the side wall of the housing. The bars rest one on top of the other to form a solid barrier to the passage of material into the outlet. The height of the weir formed by the bars, and thus the degree of holdup of material in the housing (which influences the ratio of crystallized to amorphous material) is changed by merely removing or adding bars as desired. The angular disposition of the bars facilitates material removal.

The degree of holdup is also controllable by adjusting the relationship of the housing axis with the horizontal. Schematically illustrated jack means 106 may be employed to vary the tilt of the housing with a holdup capacity being added when the discharge end is elevated from the horizontal relative to the inlet end so that the housing slopes upwardly toward the outlet means 44.

Enhanced operation of the system is achieved when the surface roughness of the discs 56 is controlled. Specifically, the tendency toward sticking of material to these surfaces is avoided or at least minimized when a "mill finish", that is a surface roughness greater than 50 rms, is maintained as opposed to a polished surface typically utilized. Where material used for making the discs is not sufficiently rough, the desired result may be achieved by peening, sand blasting, scratching or similar operations.

In an example of the practice of the invention, uncrystallized polyethylene terephthalate was added to a housing of the type shown in FIGS. 3-6. The uncrystallized material was added at the rate of 4 tons per hour, and average residence time for particles was 45 minutes. The ratio of crystallized to uncrystallized materials in the feed zone was maintained at about 4 to 1. The discs 56 were driven to achieve a tip speed of approximately 210 feet per minute. The uncrystallized material was fed to the housing at room temperature with the crystallized material exiting at a temperature of 320° F. Hot oil was introduced through pipe 58 at a temperature of 400° F. The temperature at the material inlet was maintained at approximately 50° F.

Figure 7:
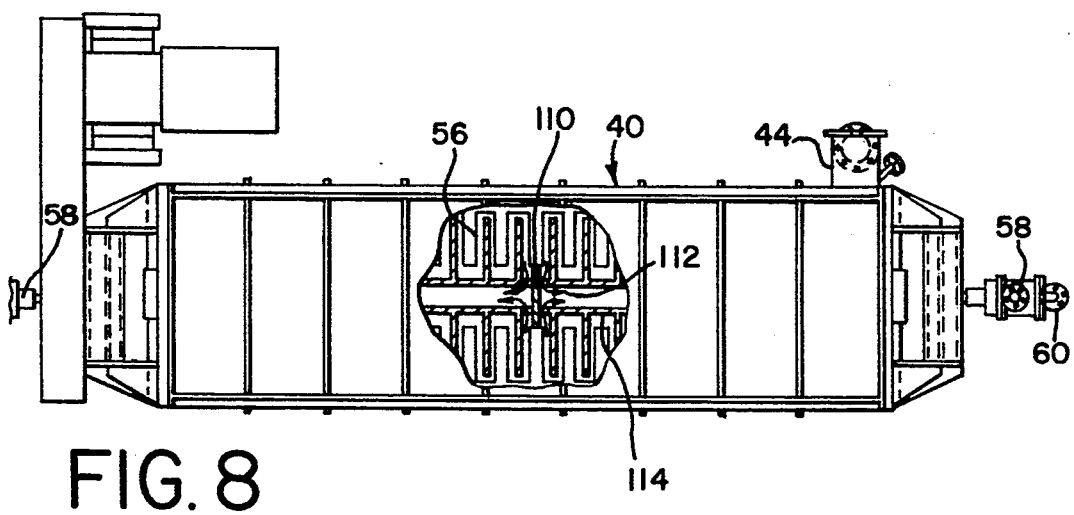
FIG. 7 is a top plan view of the apparatus, partly cut away, illustrating a split form of rotor and disc means comprising an alternative form of the invention.

FIG. 7 illustrates a modified form of the apparatus of FIG. 3 wherein the discs 56 are adapted to receive heated fluid from both ends of the apparatus and to then recirculate the fluid back to the respective ends. Thus, it will be noted that a heated fluid input pipe 58 is located at both ends of the apparatus, and these pipes deliver heated fluid to discs from each end in the manner described. A centrally located plate 110 serves as a barrier wall to divide the discs into two sections. Openings 112 are defined by rotor 114 to permit recirculation of the heated fluid back through the hollow rotor and out through discharge pipes 60.

With the arrangement of FIG. 7, material to be treated can be exposed to controlled temperature conditions in different sections of the housing. It is contemplated, for example, that the temperature of the exterior surfaces of the discs on the lefthand inlet side of the housing will be in the order of 100° F. lower than the surface temperature of the discs in the righthand side of the housing. With this arrangement, there is a more gradual heating of the material which is important with respect to more sensitive polymers. The temperature also affects the rate of crystallization and use of different temperature zones thereby provides an additional means for controlling the holdup capacity ratio.

Figure 8:
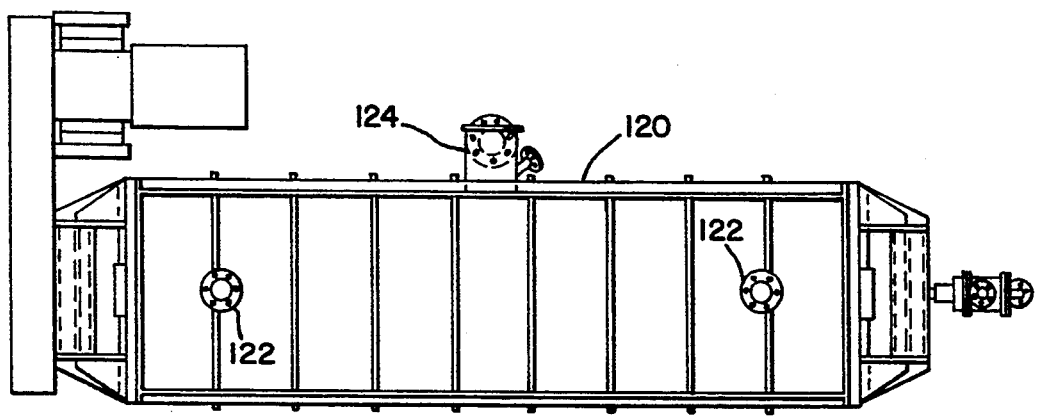
FIG. 8 is a top plan view of the apparatus illustrating a modified form of inlet and discharge means.

FIG. 8 illustrates a form of the invention wherein housing 120 is provided with a pair of inlet means 122 located at the opposite ends of the housing. A single outlet means 124 is positioned centrally of the housing and is adapted to be fed from both sides. This arrangement may be employed to improve the mass flow characteristics of the crystallizer and may also be used to improve the possible layout of the processing system.

Figure 9:
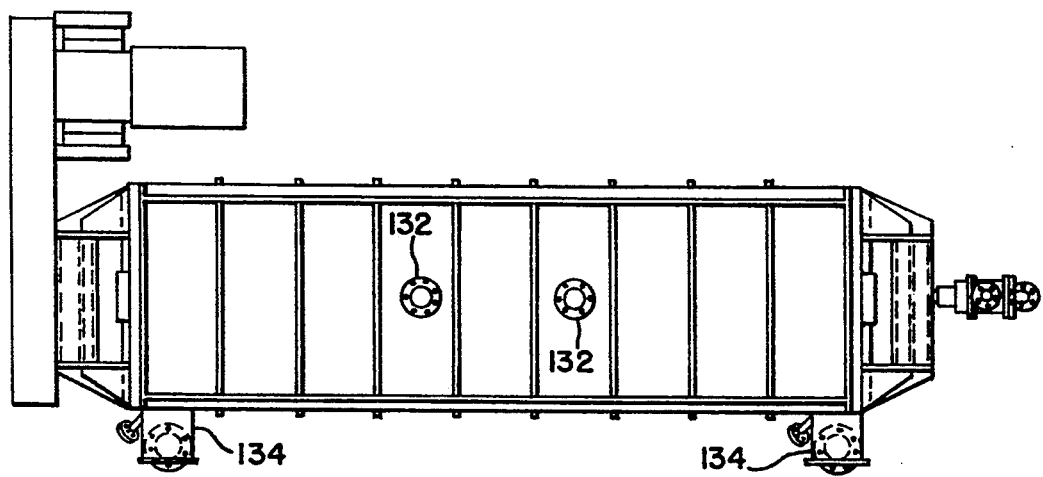
FIG. 9 is a top plan view of the apparatus illustrating another alternative form of inlet and discharge means.

A further alternative is illustrated in FIG. 9 wherein the housing 130 is provided with separate inlet means 132 located generally centrally of the housing. Separate outlet means 134 are provided for material entering from the respective inlets. The design tends to eliminate stagnation of uncrystallized chips in regions adjacent the end plates.

With the arrangements of FIGS. 8 and 9, a single rotor can be employed which will move material in opposite directions even though the rotor is rotating about its axis in the same direction in both sections of the housing. This is accomplished by means of adjustable plows or vanes 136 which are attached around the peripheral rims 138 of the hollow discs 56 in the manner shown in FIG. 3A. In accordance with the standard operating features of the TORUSDISC ® apparatus manufactured by applicants' assignee, these vanes serve as the means for controlling the direction of movement of product within the housing.

The plows 136 and associated rims 138 preferably move at relatively high speeds and in a particular spaced relationship with the inner wall of the housing. Specifically, it is contemplated that peripheral or tip speeds from between about 60 and about 500 feet per minute, for example in the order of 210 feet per minute, will provide the optimal mixing function desired for maintaining the required intensity of agitation while also serving to minimize any tendency toward sticking of material to the heat exchange surfaces.

It has also been found that the outer edges of plows 136 should be no closer than ½ to the inner surface of the housing. Spacing of up to about two inches enhances mixing and minimizes sticking contrary to the expectation that a closer spacing would be more effective. The greater spacing also tends to minimize smearing and to reduce fines generation.

Figure 10A:
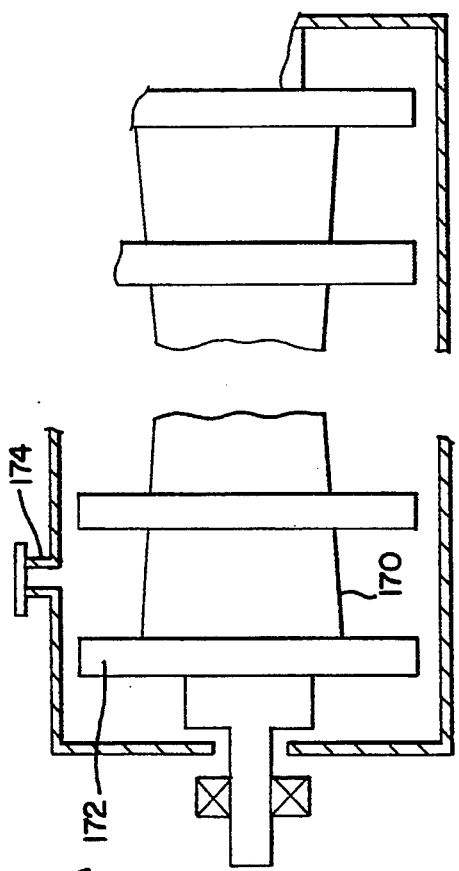
FIG. 10A is a schematic illustration of an alternative arrangement to the arrangement shown in FIG. 10.
Figure 11:
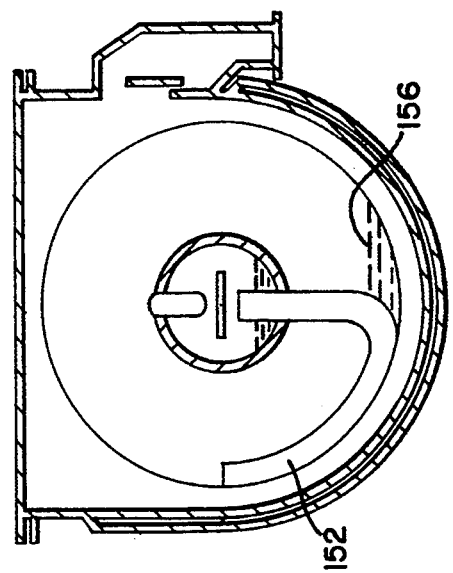
FIG. 11 is a cross-sectional view of the apparatus illustrating a means for removing condensate from each hollow disc.
Figure 10:
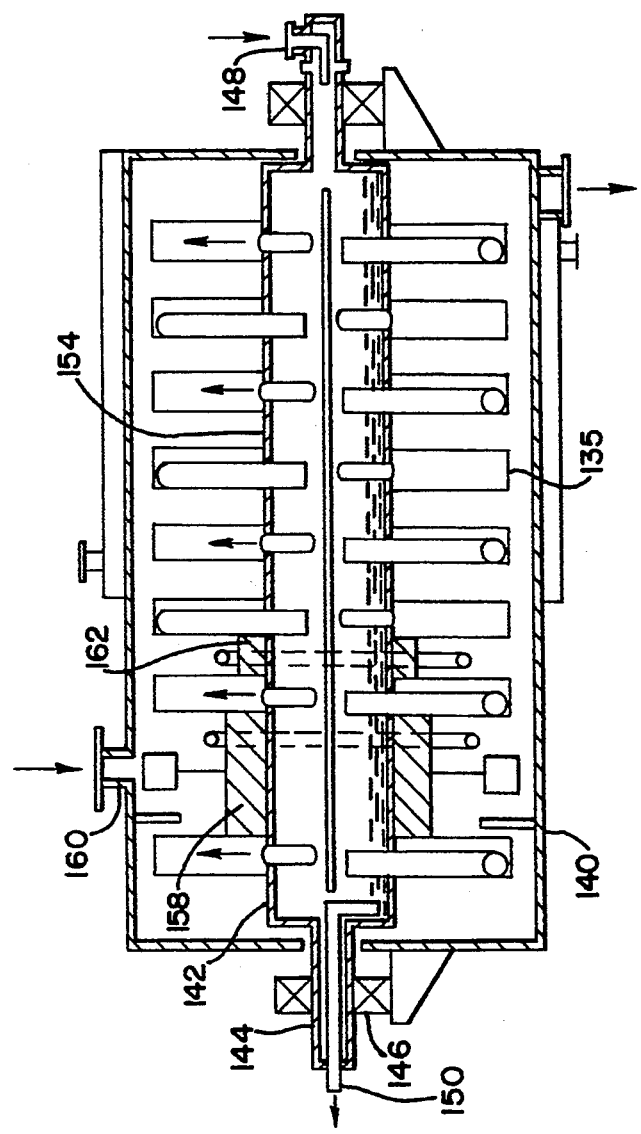
FIG. 10 is a horizontal cross-sectional view of the apparatus illustrating a modified form of a rotor and disc.

FIG. 10 illustrates further alternative embodiments of the invention. In this instance, a housing 140 supports for rotation a rotor 142 having tubular ends 144 supported by bearings 146. A steam inlet 146 serves as the means for providing heated fluid for the rotor and discs and steam outlet 150 serves as the discharge conduit.

Where steam is used as the heating fluid, there is a tendency toward the build-up of condensate within the discs. Accordingly, each disc is provided with a pipe 152 which receives any excess condensate and passes that excess condensate to the interior of the rotor 154. The condensate within the rotor is then forced out through conduit 150. It will be noted in this connection that, as used in the aforementioned TORUSDISC ® apparatus, the pipe 152 rotates with the disc and will, therefore, "scoop" the water from within the disc as it rotates thereby maintaining the condensate at an acceptable level 156 as shown in FIG. 11. It will be appreciated that the condensate may also be removed from the same end which retains steam inlet 146.

FIG. 10 illustrates another form of the invention wherein an annular heat insulation sleeve 158 is positioned around the rotor 154 in the area adjacent inlet 160. With this arrangement, material entering the housing is not immediately exposed to the surface of rotor 154 and to all of the surface area of the discs positioned adjacent the inlet. Instead, this material is insulated to a degree from such full high temperature exposure.

An adjacent annular insulating sleeve 162 of smaller diameter than the sleeve 158 is positioned between the next set of discs 155. This smaller diameter sleeve provides somewhat less insulation from the heat exchange surfaces particularly since the material being treated is exposed to a greater area of the disc surfaces so that a greater degree of heat transfer occurs in this section of the housing.

As the material moves downstream, it for the first time encounters the rotor surface and it is also exposed to the full surface area of the next pair of adjacent discs. As will be apparent, this arrangement provides for progressively increasing temperature exposure which is particularly advantageous where crystallization of sensitive polymers is involved.

It will also be appreciated that the material being fed in is subjected to the greatest stress, and the arrangement of FIG. 10 minimizes adverse effects in this area. Thus, since the volume of material is smaller in this area, and with the square inches of heat transfer surface being also smaller, less stressful conditions are encountered. With a smaller volume of material, it is also easier to control the rate of agitation and the holdup capacity ratio in the inlet zone of the crystallizer.

FIG. 10A illustrates a modification of the system shown in FIG. 10. In this instance, the rotor 170 which supports discs 172 is of greater diameter in the area immediately beneath the inlet 174. The rotor is of a conical configuration whereby the diameter gradually decreases in the downstream direction. Accordingly, the amount of exposed heated surface area gradually increases as the diameter of the rotor decreases since more of the disc surfaces become available for heat transfer.

The discharge end of the rotor is also shown in FIG. 10A and it will be noted that a gradually increasing diameter characterizes the rotor in this area. This alternative serves to enhance agitation and avoid undue variations in residence time by ensuring sufficient contact between the faster moving portions of the disc surfaces and material in a region where the level of material would otherwise be tending to drop.

Figure 13:
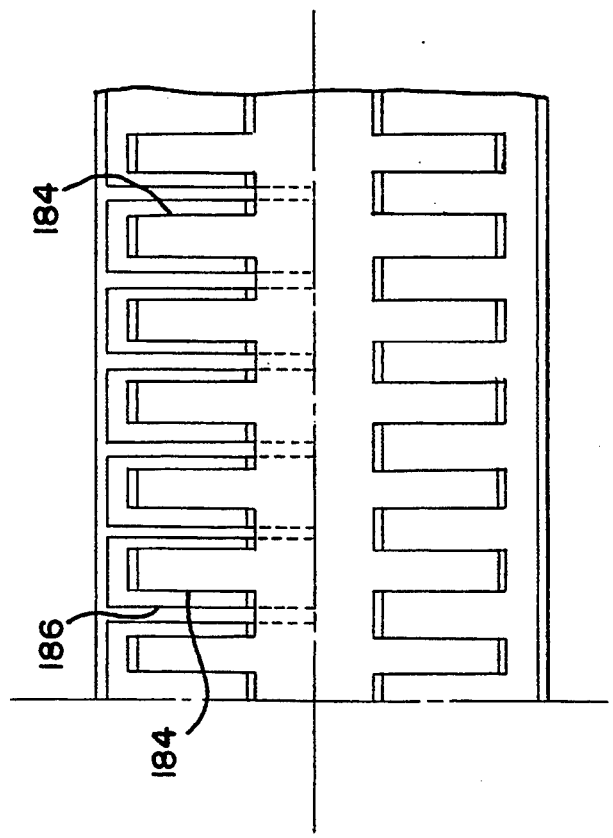
FIG. 13 is a horizontal cross-sectional view taken about the line 13—13 of FIG. 12.
Figure 12:
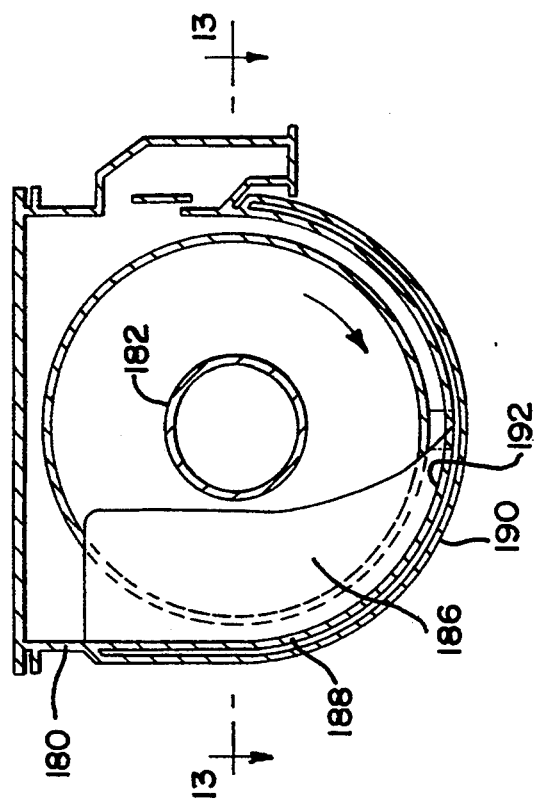
FIG. 12 is a cross-sectional view of the apparatus illustrating the use of baffles and associated means for circulating heated fluid.

FIGS. 12 and 13 illustrate a still further embodiment of the invention which is particularly suitable for efficient polymer crystallization. In this instance, a housing 180 supporting rotor 182 and a plurality of discs 184 are mounted in spaced-apart relationship on the rotor.

Positioned between each set of adjacent discs are baffles 186 which define hollow interiors and exposed outer surfaces positioned in spaced relationship with the side walls of the discs so that material is movable between these adjacent surfaces. The hollow interiors communicate with the space 188 defined between outer wall 190 and inner wall 192 of the housing 180. Heated oil or steam is adapted to be delivered between the walls 190 and 192 and into the hollow interior 186 of the baffles thereby increasing the heating surface area of the system by in the order of 30 percent.

The baffles 186 occupy areas which encounter material as it moves upwardly in response to the disc movement. The baffles thus serve a mixing function in addition to the heat exchange function.

The arrangement shown in FIGS. 12 and 13 greatly improves the mass flow performance of the apparatus. Thus, there is a tendency in a TORUSDISC® structure for uneven residence time of material introduced, for example, particles could flow through in as little as 30 minutes or for up to two hours. In the case of polymer crystallization, the longer residence time may not be harmful, however, the shorter residence time would normally be insufficient to achieve the desired reaction. The provision of baffles as shown in FIGS. 12 and 13 insures greater heat exchange to minimize problems resulting from too little residence time, and the presence of the baffles also serves to enhance the achievement of the desired holdup capacity ratio by providing for a more complete mixing action and thus more uniform flow of material through the system.

Figure 15:
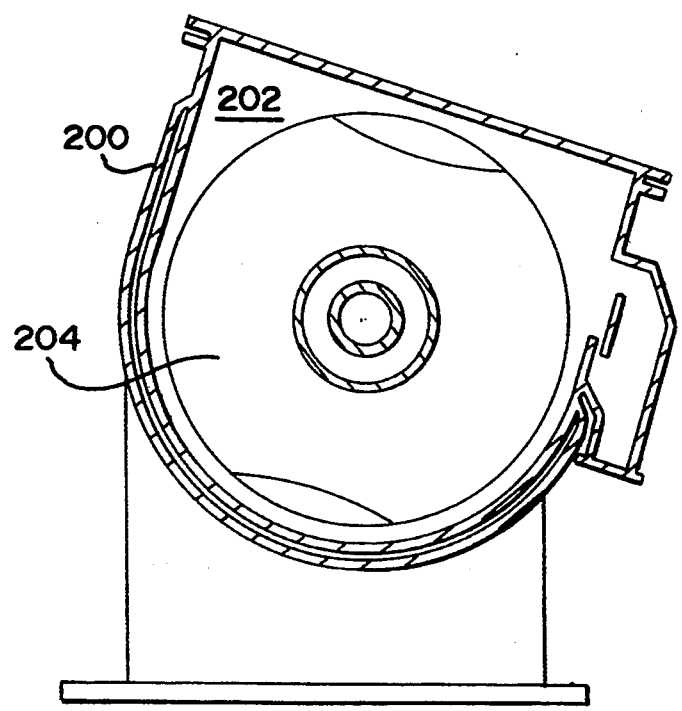
FIG. 15 is a cross-sectional view of the apparatus shown tilted from the horizontal for minimizing the collection of material in dead spaces.

FIG. 15 illustrates an alternative means for avoiding a stagnant zone in the system which would upset the ratio of crystallized to uncrystallized material in that zone. It will be noted that in this instance, the housing 200 is tilted about its axis so that material will not have a tendency to collect in the corner designated by the numeral 202. Thus, the tilting of the housing encourages the movement of material to the righthand side of the unit where it will necessarily be subject to the action of the discs 204 and thereby not remain stagnant.

Figure 16:
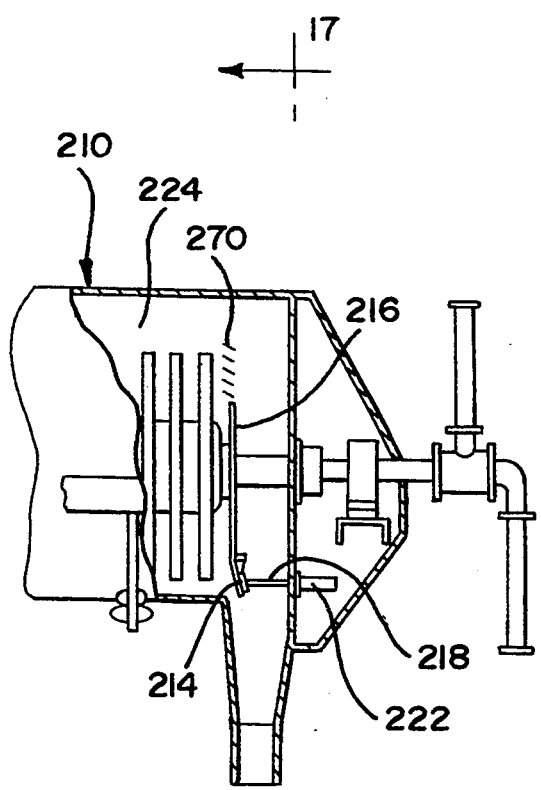
FIG. 16 is a fragmentary, schematic view of a modified housing including a bottom discharge; and, FIG. 17 is a sectional view taken about the line 17—17 of FIG. 16.
Figure 17:
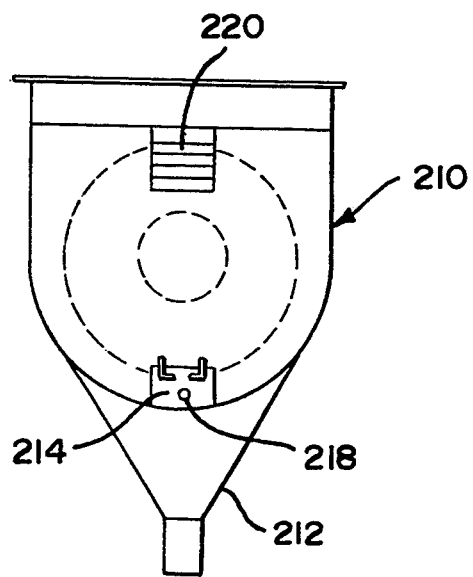

FIGS. 16 and 17 illustrate schematically an arrangement wherein the material is discharged through the bottom of the housing as opposed to a side discharge as previously described. In this case the housing 210 supports discharge passage 212 which communicates with the interior of the housing. A hinged gate 214 is supported on housing end plate 216. Piston 218 controls the angle of gate 214 and consequently the size of the opening communicating the housing with the discharge chute.

A weir 220 is carried by end plate 216 for any material overflow which would occur if the discharge past gate 214 is not sufficient. To control the rate of discharge past gate 214, the pneumohydraulic cylinder 222 and associated piston may be controlled by the output of level probe 224 mounted in the housing. The probe is preferably connected to a microprocessor which, in turn, operates the cylinder and piston to achieve precision with this arrangement.

It will be understood that various changes and modifications may be made in the system described without departing from the spirit of this invention particularly as set forth in the following claims.

We claim:

1. An apparatus for solid phase crystallization of polymers comprising a stationary housing, a rotor mounted for rotation within the housing, a plurality of spaced-apart hollow discs mounted along the length of said rotor, means for delivering heated fluid to the interior of the discs, material feed inlet means associated with said housing whereby the polymer material is adapted to engage the exterior surfaces of the discs for heating of the material, drive means for said rotor, the rotating discs operating to convey the material along the length of the housing, a material outlet means associated with said housing in spaced relationship to said inlet means, control means determining the speed of rotation of said rotor to influence agitation and conveying of material in said housing, and holdup means operating independently of said control means for fixing of residence time and for controlling the ratio of crystallized to uncrystallized material in the housing from 2 to 1 and 20 to 1.

2. An apparatus in accordance with claim 1 wherein said housing is adjustably mounted between a horizontal position and positions sloping upwardly toward said outlet means.

3. An apparatus in accordance with claim 1 wherein said housing includes a plurality of inlet means at spaced locations whereby uncrystallized material can be added at intervals to control said ratio.

4. An apparatus in accordance with claim 1 wherein said inlet means is located intermediate the ends of said housing, said discs being adapted to convey said material in opposite directions along the length of the housing, and separate material outlet means located at opposite ends of the housing.

5. An apparatus in accordance with claim 1 including separate material inlet means located at opposite ends of said housing, material outlet means located centrally of said housing, and means associated with said discs for conveying said material in opposite directions along the length of the housing toward said outlet means.

6. An apparatus in accordance with claim 1 including dividing means mounted in said rotor for separating one section of discs from an adjacent section of discs, and separate means for delivering heated fluid to the respective sections whereby said sections can be maintained at different temperatures.

7. An apparatus in accordance with claim 1 wherein said discs are cylindrical, and wherein said housing comprises a U-shaped trough with the semicylindrical portion of the U-shape defining the bottom section of the trough, the outer edges of said discs moving adjacent the inner wall defined by said semicylindrical bottom section of said housing, said outer edges being spaced from ½ inch to about two inches from said inner wall.

8. An apparatus in accordance with claim 1 wherein said rotor comprises a tubular body and including means for introducing heated fluid into the rotor body for passage to said discs.

9. An apparatus in accordance with claim 1 wherein said rotor comprises a cylindrical member, and including at least one larger diameter rotor portion adjacent said inlet means and a decreased diameter for said rotor at a location adjacent said outlet means.

10. An apparatus in accordance with claim 1 wherein said rotor defines a gradually decreasing diameter from adjacent said inlet means in the direction toward said outlet means.

11. An apparatus in accordance with claim 1 wherein said rotor is constructed in sections and wherein said sections are of decreasing diameter from adjacent said inlet end in the direction toward said outlet end.

12. An apparatus in accordance with either of claims 10 and 11 wherein said rotor defines a gradually increasing diameter in the section of the rotor adjacent said outlet means.

13. An apparatus in accordance with claim 1 wherein said discs propel said material along a spiral path through said housing whereby said material tends to be propelled downwardly on one side of the housing and upwardly on the other side of the housing, and including an insert positioned to occupy a part of the space in an upper zone of said other side of the housing to thereby minimize the volume of material occupying said upper zone.

14. An apparatus according to claim 13 wherein said insert extends from adjacent said inlet means along said housing for at least half the distance to said outlet means.

15. An apparatus according to claim 14 including a baffle attached at the end of said insert and extending radially inwardly of said housing, said baffle serving as a barrier wall directing material radially inwardly before it continues movement toward said outlet means.

16. An apparatus in accordance with claim 1 wherein said discs propel said material along a spiral path through said housing whereby said material tends to be propelled downwardly on one side of the housing and upwardly on the other side of the housing, and wherein said housing is tilted upwardly around the axis of said rotor toward said other side whereby the force of gravity minimizes the tendency of material to collect in the space in an upper zone of said other side.

17. An apparatus in accordance with claim 1 wherein said discs propel said material along a spiral path through said housing whereby said material tends to be propelled downwardly on one side of the housing and upwardly on the other side of the housing, and including breaker bar means positioned adjacent disc surfaces in said one side of said housing, said breaker bar means preventing sticking of said material to said disc surfaces during the downward movement of the material.

18. An apparatus in accordance with claim 1 wherein said holdup means comprises a weir interposed in said housing adjacent said outlet means, and means for varying the height of said weir.

19. An apparatus according to claim 1 wherein said inlet means are adjacent the top of said housing and said material is fed by gravity into the housing, and including distribution plate means positioned within said housing adjacent said inlet means whereby the material engages said plate means upon entering the housing and is distributed evenly on opposite sides of the plate means at different positions along the length of the housing.

20. An apparatus in accordance with claim 19 wherein said plate means defines an engaging surface having a portion extending toward each of the ends of the housing whereby the material introduced is divided for contact with axially spaced-apart sections of said discs.

21. An apparatus according to claim 1 wherein said heated fluid comprises steam, and including means for removing condensate from within the housing during the crystallization.

22. An apparatus according to claim 1 wherein said heated fluid comprises steam, and including means for removing condensate from within the housing during the crystallization.

23. An apparatus according to claim 1 including means for introducing pressurized air into the housing during the crystallization for contact with said material.

24. An apparatus according to claim 1 wherein said housing is double-walled and a space is defined between the walls, means for introducing heated fluid to said space between said walls to provide additional heat exchange with said material.

25. An apparatus according to claim 24 including baffles interposed between said discs, and passages defined by said baffles communicating with said space between said walls for additional heat exchange between said material and the exposed surfaces of said baffles.

* * * * *